US012508610B1

(12) United States Patent
Li

(10) Patent No.: US 12,508,610 B1
(45) Date of Patent: Dec. 30, 2025

(54) FOAM DISPENSER AND HAND SANITIZER DISPENSER

(71) Applicant: Xufang Li, Hubei (CN)

(72) Inventor: Xufang Li, Hubei (CN)

( * ) Notice: Subject to any disclaimer, the term of this patent is extended or adjusted under 35 U.S.C. 154(b) by 0 days.

(21) Appl. No.: 19/273,177

(22) Filed: Jul. 18, 2025

(30) Foreign Application Priority Data

Jul. 7, 2025 (CN) ........................ 202521414356.X

(51) Int. Cl.
*B05B 7/00* (2006.01)
*B05B 15/52* (2018.01)

(52) U.S. Cl.
CPC ............ *B05B 7/0062* (2013.01); *B05B 15/52* (2018.02)

(58) Field of Classification Search
CPC ..... B05B 7/0062; B05B 15/52; B05B 7/0037; B05B 11/047; A61K 8/731; A61K 8/046; A61K 8/8152; A45D 34/00; A45D 19/02; A61Q 5/10
See application file for complete search history.

(56) References Cited

U.S. PATENT DOCUMENTS 8,814,005 B2 * 8/2014 Banks .................. B01F 23/291 222/145.5
2010/0200615 A1 * 8/2010 Ciavarella ........... B05B 11/1087 222/207
2011/0284584 A1 * 11/2011 Velazquez ............ B05B 7/0037 206/524.1

* cited by examiner

*Primary Examiner* — Vishal Pancholi
(74) *Attorney, Agent, or Firm* — JEEN IP LAW, LLC

(57) ABSTRACT

The present disclosure relates to a foam dispenser and a hand sanitizer dispenser. The foam dispenser comprises housing, liquid supply unit, first liquid outlet passage, second liquid outlet passage, and foaming assembly. The housing is provided with transition chamber, inlet and outlet both communicating with the transition chamber. The foaming assembly is detachably disposed in the transition chamber. Liquid outlet of the liquid supply unit communicates with one end of first liquid outlet passage, and the other end of first liquid outlet passage communicates with inlet. The outlet communicates with one end of the second liquid outlet passage, such that a liquid-gas mixture provided by liquid supply unit sequentially flows through first liquid outlet passage, inlet, foaming assembly, outlet, and second liquid outlet passage to be dispensed. The technical solution provided by the present disclosure makes it convenient for users to repair the foaming component of the hand sanitizer dispenser.

10 Claims, 7 Drawing Sheets

FOAM DISPENSER AND HAND SANITIZER DISPENSER

TECHNICAL FIELD

The present disclosure relates to the technical field of cleaning appliances, and particularly relates to a foam dispenser and hand sanitizer dispenser.

BACKGROUND OF THE ART

As living standards improve, an increasing number of households have begun using hand sanitizer dispensers, which automatically dispense hand sanitizer during use, thus providing users convenience.

However, in practical use, the foaming assembly of hand sanitizer dispensers frequently becomes clogged, thereby affecting liquid dispensing and foam generation. Moreover, since existing foaming assemblies in hand sanitizer dispensers are predominantly integrally formed, they cannot be individually serviced. Consequently, users often resort to replacing the entire hand sanitizer dispenser, which also results in a shorter service life for such devices.

SUMMARY OF THE PRESENT INVENTION

The objective of the present disclosure is to provide a foam dispenser and a hand sanitizer dispenser, thereby facilitating user maintenance of the foaming assembly in the hand sanitizer dispenser.

According to one aspect of the present disclosure, a foam dispenser is provided. The foam dispenser comprises a housing, a liquid supply unit, a first liquid outlet passage, a second liquid outlet passage, and a foaming assembly. The housing is provided with a transition chamber, and an inlet and an outlet both communicating with the transition chamber. The foaming assembly is detachably disposed in the transition chamber. A liquid outlet of the liquid supply unit communicates with one end of the first liquid outlet passage, and the other end of the first liquid outlet passage communicates with the inlet. The outlet communicates with one end of the second liquid outlet passage, such that a liquid-gas mixture provided by the liquid supply unit sequentially flows through the first liquid outlet passage, the inlet, the foaming assembly, the outlet, and the second liquid outlet passage to be dispensed.

The technical solution provided in the present application enables the foaming assembly to be detachably installed in the transition chamber of the housing, with the liquid outlet passages configured to flow through the foaming assembly. Thereby, not only can the liquid-gas mixture supplied by the liquid supply unit be transformed into foam by the foaming assembly, but also, in the event of clogging, users can remove the foaming assembly from the transition chamber for maintenance. This facilitates user servicing of the foaming assembly in the hand sanitizer dispenser without replacing the entire device, reducing maintenance costs for users.

As a further improvement to the aforementioned technical solution: the transition chamber further comprises an installation opening, and the foaming assembly is detachably installed in the transition chamber through the installation opening.

As a further improvement to the aforementioned technical solution: the foam dispenser further comprises a sealing cover that detachably covers the installation opening.

As a further improvement to the aforementioned technical solution: the transition chamber comprises a first sub-chamber and a second sub-chamber in communication with each other; the inlet communicates with the outlet sequentially through the first sub-chamber and the second sub-chamber; the foaming assembly is at least partially positioned in the second sub-chamber; and the installation opening directly communicates with the first sub-chamber.

As a further improvement to the aforementioned technical solution: a gripping groove is provided at an end of the second sub-chamber proximate to the first sub-chamber; the foaming assembly is provided with an external flange proximate to an end of the second sub-chamber, wherein the external flange at least partially extends to the gripping groove while maintaining a predetermined distance from a bottom surface of the gripping groove.

As a further improvement to the aforementioned technical solution: a sealing element is provided between the foaming assembly and an inner wall surface of the second sub-chamber.

As a further improvement to the aforementioned technical solution: the housing comprises an upper housing and a lower housing detachably connected to each other, wherein the liquid supply unit, the first liquid outlet passage, the second liquid outlet passage, and the foaming assembly are disposed on the upper housing; the installation opening is located on a bottom surface of the upper housing; when the upper housing and the lower housing are connected, the lower housing covers the installation opening.

As a further improvement to the aforementioned technical solution: the lower housing is provided with a solution chamber, and a liquid outlet of the liquid supply unit communicates with the solution chamber.

As a further improvement to the aforementioned technical solution: the foaming assembly comprises a first foaming mesh, a second foaming mesh, and a support ring, wherein the first foaming mesh and the second foaming mesh are positioned at both ends of the support ring.

According to another aspect of the present disclosure, a hand sanitizer dispenser is provided. The hand sanitizer dispenser comprises the aforementioned foam dispenser.

DESCRIPTION OF THE DRAWINGS

To illustrate the technical solutions in the embodiments of the present disclosure more clearly, the following briefly introduces the accompanying drawings required for describing the embodiments. Obviously, the drawings in the following description merely represent some embodiments of the present disclosure. For those of ordinary skill in the art, other drawings may be derived from these drawings without creative effort.

DESCRIPTION OF REFERENCE NUMBERS

Figure 1:
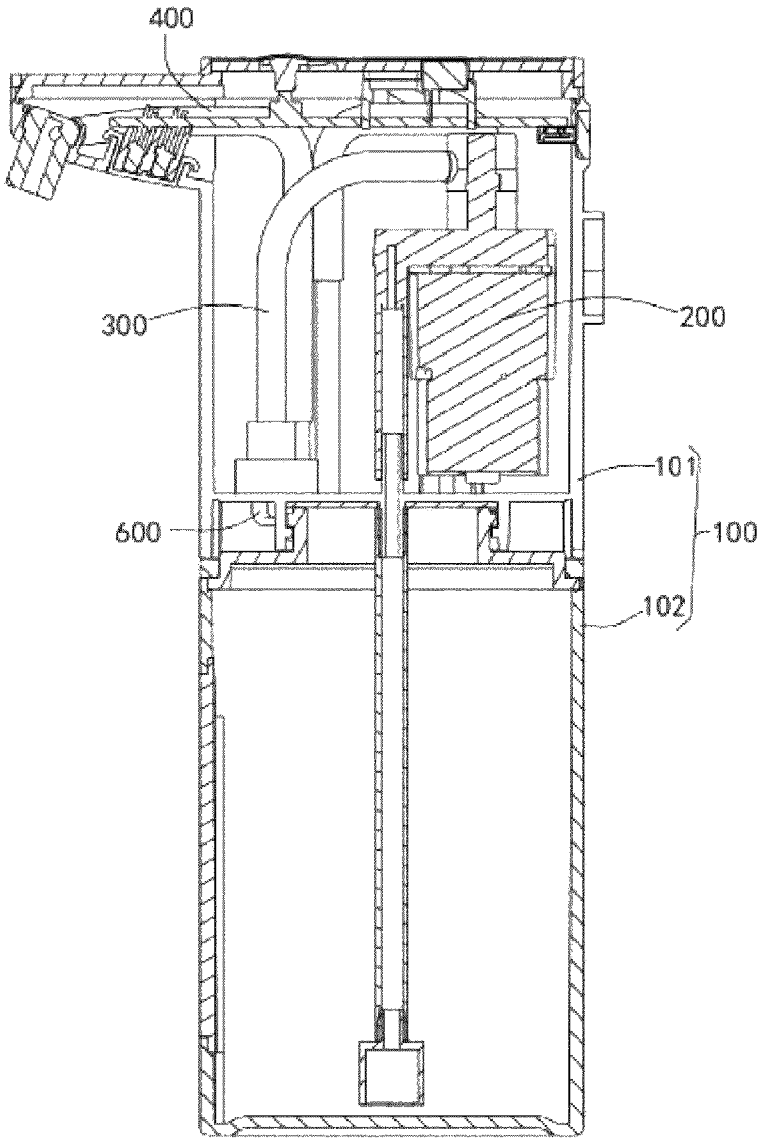
FIG. 1 shows a semi-schematic cross-sectional view of a hand sanitizer dispenser according to one embodiment of the present disclosure.
Figure 2:
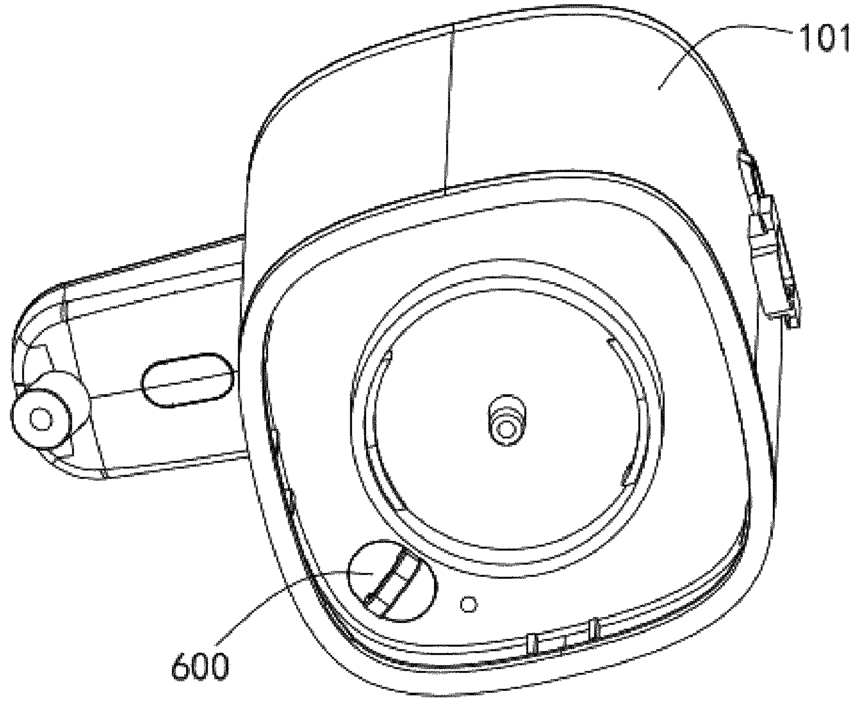
FIG. 2 shows a partial schematic structural view of the hand sanitizer dispenser according to one embodiment of the present disclosure.

100: Housing; 101: Upper housing; 102: Lower housing; 110: Transition chamber; 111: First sub-chamber; 112: Second sub-chamber; 113: Gripping groove; 120: Inlet; 130: Outlet; 140: Installation opening;
200: Liquid supply unit;
300: First liquid outlet passage;
400: Second liquid outlet passage;
500: Foaming assembly; 510: External flange; 520: First foaming mesh; 530: Second foaming mesh; 540: Support ring;
600: Sealing cover.

DETAILED DESCRIPTION OF EMBODIMENTS

To ensure clarity regarding the purpose, technical solutions, and advantages of the embodiments of the present disclosure, the technical solutions in the embodiments of the present disclosure will be clearly and comprehensively described below in conjunction with the accompanying drawings. Obviously, the described embodiments represent a part of the embodiments of the present disclosure, but not all embodiments.

As shown in FIGS. 1 to 7, the foam dispenser of the present embodiment is an apparatus for generating foam. It may be used as a hand sanitizer dispenser, or alternatively, as a foam mask applicator or other devices requiring foam generation.

Specifically, the foam dispenser may comprise a housing 100, a liquid supply unit 200, a first liquid outlet passage 300, a second liquid outlet passage 400, and a foaming assembly 500. The housing 100 serves as the structural foundation of the foam dispenser, supporting and carrying other components. The housing 100 is provided with a transition chamber 110, an inlet 120 communicating with the transition chamber 110, and an outlet 130 communicating with the transition chamber 110. The foaming assembly 500 is detachably disposed within the transition chamber 110. Thus, when the foaming assembly 500 is clogged, users can remove it from the transition chamber 110 for maintenance. This facilitates servicing of the foaming assembly 500 in the hand sanitizer dispenser without replacing the entire device, thereby reducing user maintenance costs. By way of example, the transition chamber 110 may be defined by a main body of the housing 100, or alternatively, by additional components connected to the housing 100. In this regard, no specific limitation is imposed.

A liquid outlet of the liquid supply unit 200 communicates with a first end of the first liquid outlet passage 300; a second end of the first liquid outlet passage 300 communicates with the inlet 120; the outlet 130 communicates with a first end of the second liquid outlet passage 400. Such that the liquid-gas mixture supplied by the liquid supply unit 200 sequentially flows through the first liquid outlet passage 300, the inlet 120, and the foaming assembly 500 to form foam within the transition chamber 110, and subsequently exits through the outlet 130 and the second liquid outlet passage 400 for user application. By way of example, the first liquid outlet passage 300 and the second liquid outlet passage 400 may be integral channels formed within the housing 100. Alternatively, the liquid outlet passages 300, 400 may be implemented as separate tubing, such as PVC pipes or metal tubes.

It should be noted that the specific structure of the liquid supply unit 200 may reference existing art. Its operational principle may involve a pump mechanism-such as a diaphragm pump or gear pump-driven by an electric motor to draw liquid. Simultaneously, the pump generates negative pressure at an air intake port to aspirate air, thereby mixing the liquid and air in a predetermined ratio. In such operation, the liquid supply unit 200 is also provided with an air inlet. Alternatively, the operational principle may utilize a centrifugal rotor driven by an electric motor, wherein hand sanitizer is propelled radially outward to mix with entrained air. This disclosure encompasses both approaches without imposing specific limitations.

Furthermore, the transition chamber 110 is further provided with an installation opening 140. The foaming assembly 500 is detachably installed within the transition chamber 110 through this installation opening 140, thereby facilitating its removal via the installation opening 140.

In certain embodiments, when the foaming assembly 500 is installed within the transition chamber 110, it seals the installation opening 140, thereby preventing leakage of liquid from the transition chamber 110.

In certain other embodiments, as shown in FIGS. 3 to 6, the foam dispenser further comprises a sealing cover 600. The sealing cover 600 detachably covers the installation opening 140, thereby sealing the installation opening 140 with the sealing cover 600 and preventing leakage of liquid from the transition chamber 110.

Further, a sealing element may be provided between the sealing cover 600 and the installation opening 140 to enhance sealing effectiveness.

Figure 3:
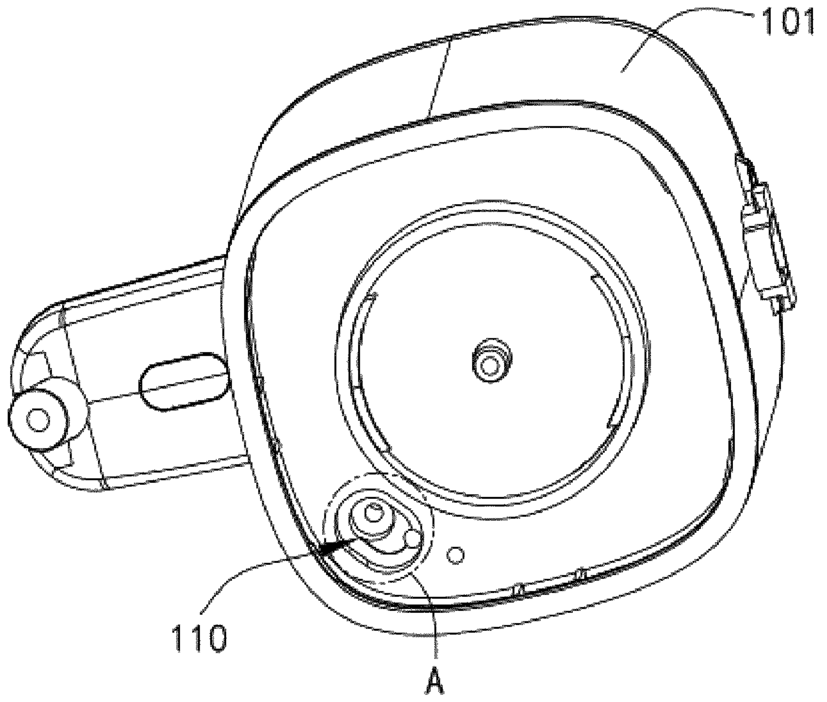
FIG. 3 shows a structural view of FIG. 2 with the sealing cover and foaming assembly removed.
Figure 4:
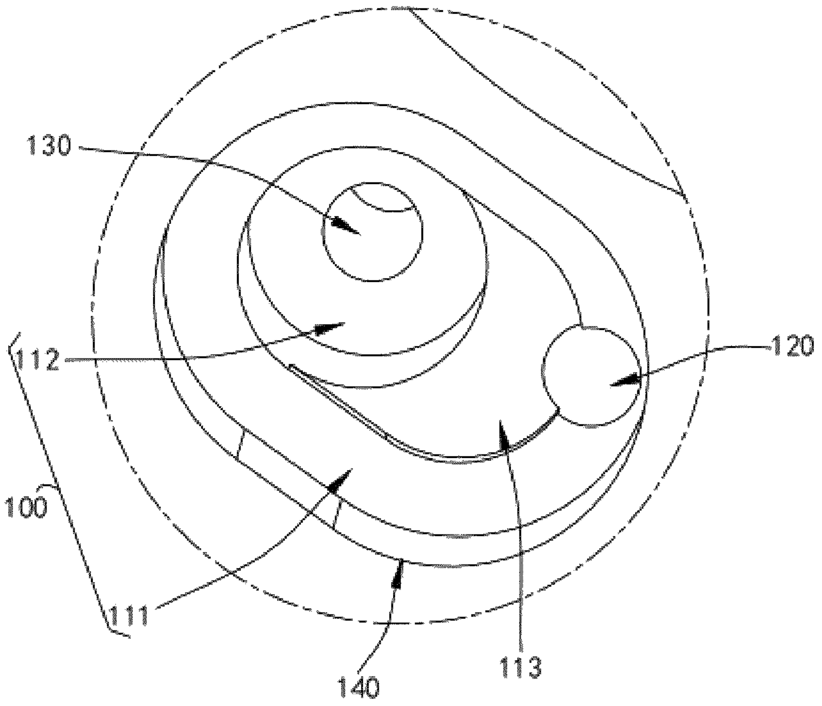
FIG. 4 shows an enlarged view of portion A in FIG. 3.
Figure 5:
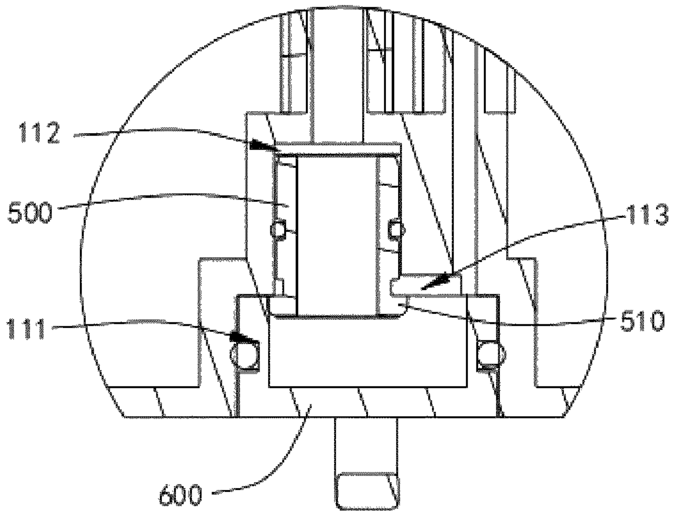
FIG. 5 shows a semi-schematic cross-sectional view of a partial structure of the hand sanitizer dispenser at the foaming assembly according to one embodiment of the present disclosure.
Figure 6:
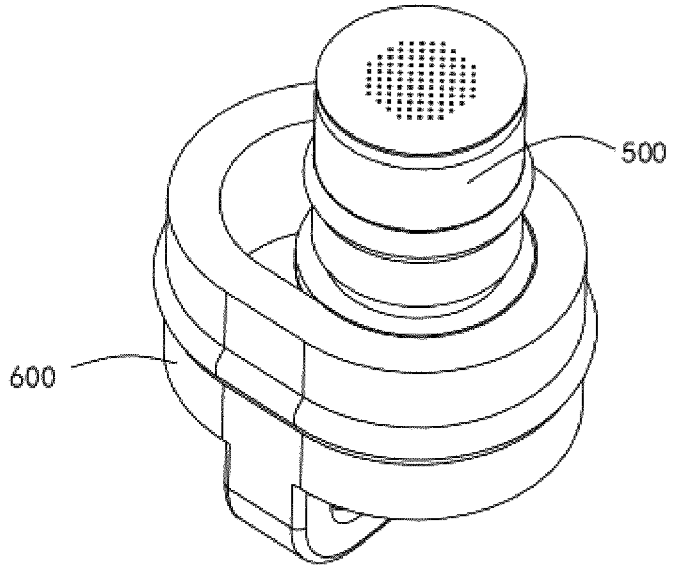
FIG. 6 shows a structural view of a sealing cover and foaming assembly according to one embodiment of the present disclosure.
Figure 7:
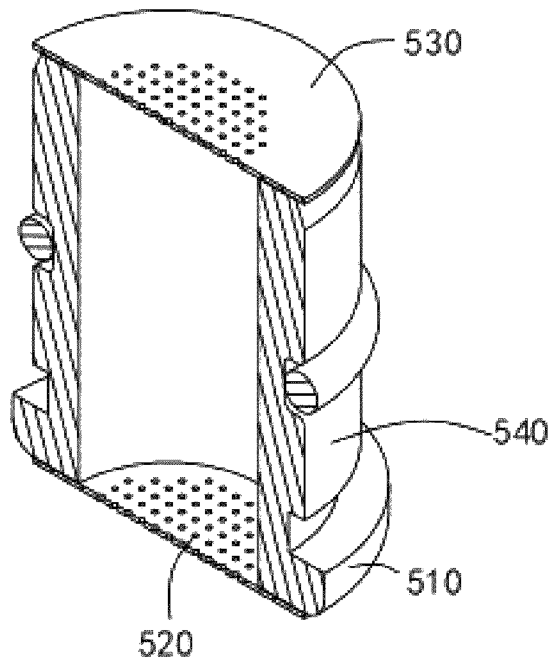
FIG. 7 shows a semi-schematic cross-sectional view of a foaming assembly according to one embodiment of the present disclosure.

In certain embodiments, as shown in FIGS. 3 to 5, the transition chamber 110 comprises a first sub-chamber 111 and a second sub-chamber 112 in mutual communication. The inlet 120 communicates with the outlet 130 sequentially through the first sub-chamber 111 and the second sub-chamber 112. The foaming assembly 500 is at least partially positioned within the second sub-chamber 112, while the installation opening 140 directly communicates with the first sub-chamber 111. Thus, the liquid-gas mixture supplied by the liquid supply unit 200 advances into the first sub-chamber 111 via the inlet 120, is subsequently foamed by the foaming assembly 500, and is then discharged through the outlet 130.

To facilitate removal of the foaming assembly 500 from the second sub-chamber 112, in certain embodiments, a gripping groove 113 is provided at an end of the second sub-chamber 112 proximate to the first sub-chamber 111. The foaming assembly 500 is provided with an external flange 510 proximate to an end of the second sub-chamber 112, wherein the external flange 510 at least partially extends to the gripping groove 113 while maintaining a predetermined distance from a bottom surface of the gripping groove 113. Thus, by utilizing the predetermined distance maintained between the external flange 510 and the bottom surface of the gripping groove 113, extraction tools or fingers may be positioned to grip the external flange 510, thereby facilitating removal of the foaming assembly 500 from the second sub-chamber 112.

Further, a sealing element is provided between the foaming assembly 500 and an inner wall surface of the second sub-chamber 112. This configuration prevents bypass flow of the liquid-gas mixture around the foaming assembly 500, thereby ensuring all fluid passes through the foaming assembly 500 to enhance foam formation quality.

In certain embodiments, the housing 100 comprises an upper housing 101 and a lower housing 102 detachably connected to each other. The liquid supply unit 200, first liquid outlet passage 300, second liquid outlet passage 400, and foaming assembly 500 are disposed on the upper housing 101, with the installation opening 140 located on a bottom surface of the upper housing 101. When the upper housing 101 and lower housing 102 are connected, the lower housing 102 covers the installation opening 140, thereby concealing the service access area for the foaming assembly 500 and enhancing the aesthetic appearance of the device.

In particular, the liquid supply unit 200 may draw liquid from an external environment.

Alternatively, the liquid supply unit 200 may draw liquid from an internal solution chamber within the housing 100. By way of example, a solution chamber is disposed within the housing 100 for containing a solution (e.g., hand sanitizer). Specifically, the solution chamber may be provided in the lower housing 102, wherein a liquid outlet of the liquid supply unit 200 communicates with the solution chamber to draw liquid therefrom.

In certain embodiments, the foaming assembly 500 may comprise a first foaming mesh 520, a second foaming mesh 530, and a support ring 540, wherein the first foaming mesh 520 and the second foaming mesh 530 are positioned at both ends of the support ring 540. The outer flange 510 is provided on the support ring 540.

Further, the first foaming mesh 520 and the second foaming mesh 530 are detachably connected to the support ring 540. Thereby, when the first foaming mesh 520 or the second foaming mesh 530 becomes clogged or damaged, each mesh can be individually cleaned or replaced without disassembling the entire foaming assembly 500. By way of example, the first foaming mesh 520 and the second foaming mesh 530 may abut against both ends of the support ring 540; alternatively, they may be press-fitted onto both ends of the support ring 540.

Based on the same inventive concept, the present disclosure further provides a hand sanitizer dispenser comprising the aforementioned foam dispenser.

It should be noted that the specific structure of the foam dispenser may be referenced in detail within the aforementioned embodiments and will not be reiterated herein.

In the present disclosure, directional terms such as "upper" and "lower" are used to describe the relative positional relationships of structural elements in the accompanying drawings. These terms are employed solely for clarity of description and are not intended to limit the implementable scope of the present disclosure. Modifications or adjustments to such relative relationships shall be considered within the implementable scope of the present disclosure, provided they involve no substantive changes to the technical solution.

It should be noted that in the present disclosure, unless otherwise expressly specified or limited, a first feature being "on" or "under" a second feature may include direct contact between the first and second features, or indirect contact via an intermediary medium. Moreover, the first feature being "on", "above", or "over" the second feature can mean that the first feature is directly above or obliquely above the second feature, or simply that the horizontal height of the first feature is greater than that of the second feature. The first feature being "under", "below", or "beneath", the second feature can mean that the first feature is directly beneath or obliquely beneath the second feature, or simply that the horizontal height of the first feature is less than that of the second feature.

Furthermore, in the present disclosure, unless otherwise expressly specified or limited, terms such as "install," "connect," "link," and "fix" shall be construed broadly. For instance, connections may be fixed or detachable, or may form an integral unit; they may be direct or indirect via an intermediary medium, and may refer to internal communication between two elements or an interactive relationship between them. Those of ordinary skill in the art may understand the specific meanings of the aforementioned terms in the present disclosure according to the specific technical context.

In the description of this specification, reference terms such as "one embodiment," "some embodiments," "illustrative embodiment," "example," "specific example," or "some examples" mean that specific features, structures, materials, or characteristics described in connection with that embodiment or example are incorporated in at least one embodiment or example of the present disclosure. In this specification, the illustrative descriptions of the above terms do not necessarily refer to the same embodiment or example. Moreover, the specific features, structures, materials, or characteristics described can be combined in a suitable manner in any one or more embodiments or examples.

Finally, it should be understood that the above embodiments are merely illustrative of the technical solutions of the present disclosure and are not intended to limit its scope. Although the present disclosure has been described in detail with reference to the foregoing embodiments, those of ordinary skill in the art may still modify the technical solutions described in these embodiments or make equivalent substitutions to some or all of their technical features. Such modifications or substitutions will not cause the essence of the respective technical solutions to depart from the scope of the technical solutions set forth in the embodiments of the present disclosure.

What is claimed is:

1. A foam dispenser comprising a housing (100), a liquid supply unit (200), a first liquid outlet passage (300), a second liquid outlet passage (400), and a foaming assembly (500), wherein, the housing (100) is provided with a transition chamber (110), an inlet (120) communicating with the transition chamber (110), and an outlet (130) communicating with the transition chamber (110);

the foaming assembly (500) is detachably disposed in the transition chamber (110);

a liquid outlet of the liquid supply unit (200) communicates with a first end of the first liquid outlet passage (300); a second end of the first liquid outlet passage (300) communicates with the inlet (120); the outlet (130) communicates with a first end of the second liquid outlet passage (400); and such that a liquid-gas mixture provided by the liquid supply unit (200) sequentially flows through the first liquid outlet passage (300), the inlet (120), the foaming assembly (500), the outlet (130), and the second liquid outlet passage (400) to be dispensed; and the foaming assembly (500) comprises a first foaming mesh (520), a second foaming mesh (530), and a support ring (540); and the first foaming mesh (520) and the second foaming mesh (530) are positioned at two ends of the support ring (540).

2. The foam dispenser according to claim 1, characterized in that: the transition chamber (110) further has an installation opening (140); and the foaming assembly (500) is detachably installed in the transition chamber (110) through the installation opening (140).

3. The foam dispenser according to claim 2, characterized in that: the foam dispenser further comprises a sealing cover (600); and the sealing cover (600) detachably covers the installation opening (140).

4. The foam dispenser according to claim 3, characterized in that: the transition chamber (110) comprises a first sub-chamber (111) and a second sub-chamber (112) in communication with each other; the inlet (120) communicates with the outlet (130) sequentially through the first sub-chamber (111) and the second sub-chamber (112); the foaming assembly (500) is at least partially positioned in the second sub-chamber (112); and the installation opening (140) directly communicates with the first sub-chamber (111).

5. The foam dispenser according to claim 4, characterized in that: a gripping groove (113) is provided at an end of the second sub-chamber (112) proximate to the first sub-chamber (111);

the foaming assembly (500) is provided with an external flange (510) proximate to an end of the second sub-chamber (112), wherein the external flange (510) at least partially extends to the gripping groove (113) such that a predetermined distance is maintained between the external flange (510) and a bottom surface of the gripping groove (113).

6. The foam dispenser according to claim 4, characterized in that: a sealing element is provided between the foaming assembly (500) and an inner wall surface of the second sub-chamber (112).

7. The foam dispenser according to claim 2, characterized in that: the housing (100) comprises an upper housing (101) and a lower housing (102) detachably connected to each other; the liquid supply unit (200), the first liquid outlet passage (300), the second liquid outlet passage (400), and the foaming assembly (500) are disposed on the upper housing (101); the installation opening (140) is located on a bottom surface of the upper housing (101);

when the upper housing (101) and the lower housing (102) are connected, the lower housing (102) covers the installation opening (140).

8. The foam dispenser according to claim 7, characterized in that: the lower housing (102) is provided with a solution chamber; and a liquid outlet of the liquid supply unit (200) communicates with the solution chamber.

9. A hand sanitizer dispenser characterized in that: it comprises a housing (100), a liquid supply unit (200), a first liquid outlet passage (300), a second liquid outlet passage (400), and a foaming assembly (500), wherein, the housing (100) is provided with a transition chamber (110), an inlet (120) communicating with the transition chamber (110), and an outlet (130) communicating with the transition chamber (110);

the foaming assembly (500) is detachably disposed in the transition chamber (110);

a liquid outlet of the liquid supply unit (200) communicates with a first end of the first liquid outlet passage (300); a second end of the first liquid outlet passage (300) communicates with the inlet (120); the outlet (130) communicates with an end of the second liquid outlet passage (400); and such that a liquid-gas mixture provided by the liquid supply unit (200) sequentially flows through the first liquid outlet passage (300), the inlet (120), the foaming assembly (500), the outlet (130), and the second liquid outlet passage (400) to be dispensed; and the foaming assembly (500) comprises a first foaming mesh (520), a second foaming mesh (530), and a support ring (540); and the first foaming mesh (520) and the second foaming mesh (530) are positioned at two ends of the support ring (540).

10. A foam dispenser comprising a housing (100), a liquid supply unit (200), a first liquid outlet passage (300), a second liquid outlet passage (400), and a foaming assembly (500), wherein, the housing (100) is provided with a transition chamber (110), an inlet (120) communicating with the transition chamber (110), and an outlet (130) communicating with the transition chamber (110);

the foaming assembly (500) is detachably disposed in the transition chamber (110);

a liquid outlet of the liquid supply unit (200) communicates with a first end of the first liquid outlet passage (300); a second end of the first liquid outlet passage (300) communicates with the inlet (120); the outlet (130) communicates with a first end of the second liquid outlet passage (400); and such that a liquid-gas mixture provided by the liquid supply unit (200) sequentially flows through the first liquid outlet passage (300), the inlet (120), the foaming assembly (500), the outlet (130), and the second liquid outlet passage (400) to be dispensed;

the transition chamber (110) further has an installation opening (140); and the foaming assembly (500) is detachably installed in the transition chamber (110) through the installation opening (140);

the foam dispenser further comprises a sealing cover (600); and the sealing cover (600) detachably covers the installation opening (140); and the transition chamber (110) comprises a first sub-chamber (111) and a second sub-chamber (112) in communication with each other; the inlet (120) communicates with the outlet (130) sequentially through the first sub-chamber (111) and the second sub-chamber (112); the foaming assembly (500) is at least partially positioned in the second sub-chamber (112); and the installation opening (140) directly communicates with the first sub-chamber (111).

* * * * *